United States Patent [19]

Litin

[11] Patent Number: 5,527,052
[45] Date of Patent: Jun. 18, 1996

[54] SPILL CONTAINING DRUM CART

[75] Inventor: Michael H. Litin, Jamesville, Wis.

[73] Assignee: Enpac Corporation, Chardon, Ohio

[21] Appl. No.: 201,019

[22] Filed: Feb. 24, 1994

[51] Int. Cl.⁶ .................................................. B62B 1/26
[52] U.S. Cl. ...................... 280/47.26; 280/830; 280/795;
    220/571; 220/4.13; 141/88
[58] Field of Search ............................ 280/47.26, 79.5,
    280/79.6, 831, 836, 839, 830, 47.33, 47.17,
    47.19, 47.23, 47.24, 79.2; 220/571, 573,
    DIG. 24, 4.04, 4.05, 4.06, 4.12, 4.13; 141/86,
    88; 184/106; 222/608; 248/129; 108/24;
    137/234.6, 312; D9/517; D34/19, 20, 25,
    29

[56] References Cited

U.S. PATENT DOCUMENTS

| | | | |
|---|---|---|---|
| 454,448 | 6/1891 | Barley | 280/79.5 |
| 462,112 | 10/1891 | Coup | 280/47.34 |
| 640,118 | 12/1899 | Eck | 280/830 |
| 861,848 | 7/1907 | Herreid | 248/129 |
| 948,994 | 2/1910 | Howland | 220/571 |
| 1,063,724 | 6/1913 | Patterson | 220/571 |
| 1,487,065 | 3/1924 | Irons | 220/571 |
| 2,707,351 | 5/1955 | Walker | 280/79.2 |
| 3,353,615 | 11/1967 | Nekimken | 220/571 |
| 3,391,730 | 7/1968 | Calhoun et al. | 62/457.1 |
| 3,920,144 | 11/1975 | Callen | 220/571 |
| 4,106,648 | 8/1978 | Dickson | 280/47.24 |
| 4,775,067 | 10/1988 | Mount | 280/79.5 |
| 5,114,046 | 5/1992 | Bryant | 220/571 |
| 5,118,004 | 6/1992 | Carilli | 220/571 |
| 5,292,140 | 3/1994 | Laing | 280/79.5 |

FOREIGN PATENT DOCUMENTS 0141474  7/1953  Sweden ........................ 280/47.26

*Primary Examiner*—Anne Marie Boehler
*Attorney, Agent, or Firm*—Pearne, Gordon, McCoy & Granger

[57] ABSTRACT

A molded plastic cart has an inner wall conforming to a drum to be carried. An outer wall is spaced from the inner wall to create a containment space therebetween. One end of the cart has a recess for collecting spills or overflow from the drum. Apertures in the recess allow fluid to flow into the containment space where it is held until emptied through a drain hole. The cart is tiltable and has wheels to facilitate transport of the drum.

11 Claims, 2 Drawing Sheets

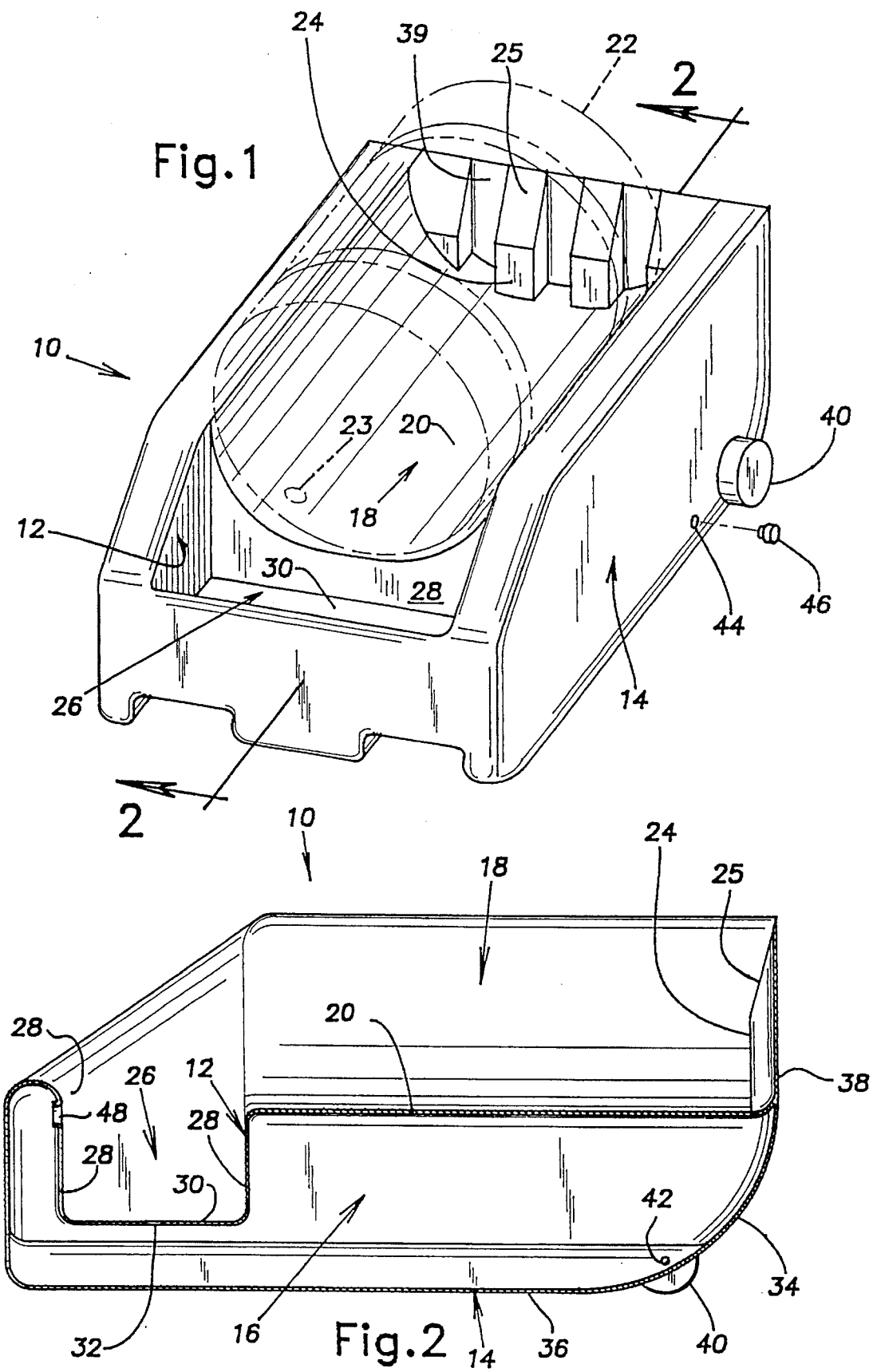

SPILL CONTAINING DRUM CART

BACKGROUND OF THE INVENTION

1. Field of the Invention

This invention relates generally to the field of drum handling and specifically to a drum cart having a spill containment feature.

2. Description of the Related Art

Metal drums or barrels are commonly used to transport liquids. Typically, the drums are cylindrical and have 55 or 30 gallon capacities. It is often necessary to transport individual drums manually. For this purpose, dollies or carts are commonly used. One such cart is shown in U.S. Pat. No. 4,106,648 to Dickson.

For a variety of reasons, the drums sometimes leak. Caps or plugs may be poorly fit or installed, seals may wear or corrode, or overflow may collect on the top. Spills may also occur during filling or emptying of a drum. Sometimes, the contents of the drum is toxic or hazardous. Therefore, it is desirable to have a cart for transporting drums which will contain spills or leaks from the drum.

SUMMARY OF THE INVENTION

The present invention provides a drum cart constructed of a body having an inner wall defining a receptacle for a drum. The inner wall is joined with and is spaced from an outer wall to define a containment space therebetween. A roller is disposed on the body to permit movement of the cart. An aperture in the inner wall defines a passage into the containment space.

The inner wall defines a support surface conforming to the drum. A recess in the inner wall at an end of the support surface has an aperture communicating between the recess and the containment space. A roller is disposed on the cart so as to support the outer wall above the floor surface at a certain angle of the cart for facilitating movement thereof. A drain hole through the outer wall is plugged with a removable drain plug.

According to the invention, the drum is easily loaded onto and supported by the cart in an upright position. The drum is transported by tilting and rolling the cart. Spilled or excess fluid is captured in the recess and flows into the containment space.

The cart is easy to use and permits the drum to be filled, emptied or used on the cart. The cart provides spill containment for safety and cleanliness. Fluids in the containment space are easily transported and properly disposed.

BRIEF DESCRIPTION OF THE DRAWINGS

FIG. 1 shows a perspective view of a drum cart according to the invention;

FIG. 2 shows a side elevational view in section taken from line 2—2 of FIG. 1;

DESCRIPTION OF THE PREFERRED EMBODIMENTS

Figure 3:
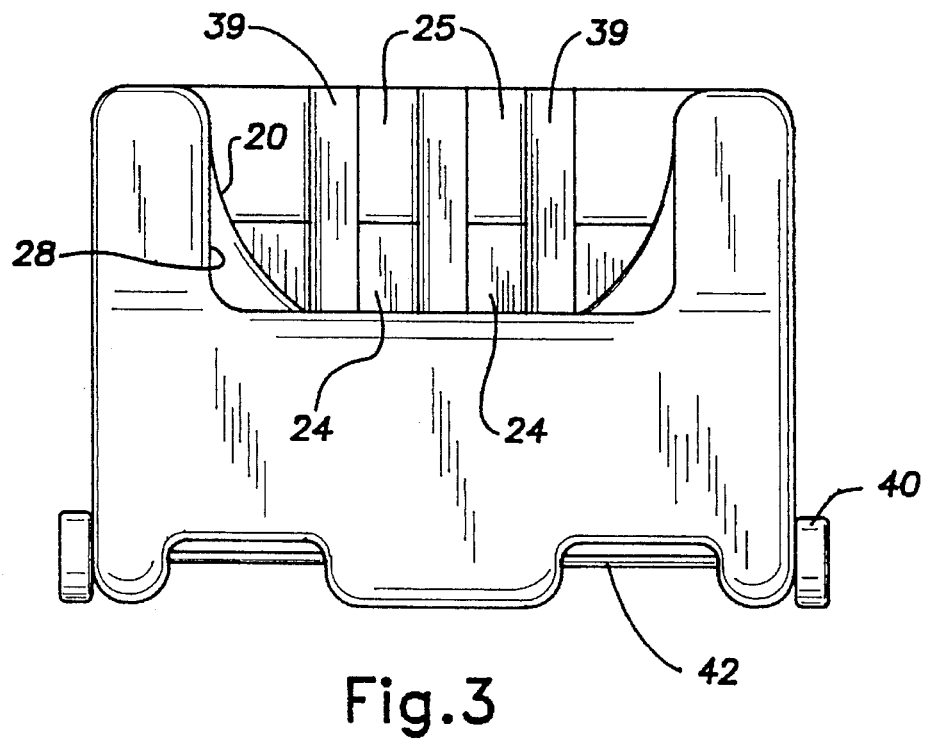
FIG. 3 shows a front end view of the cart.
Figure 4:
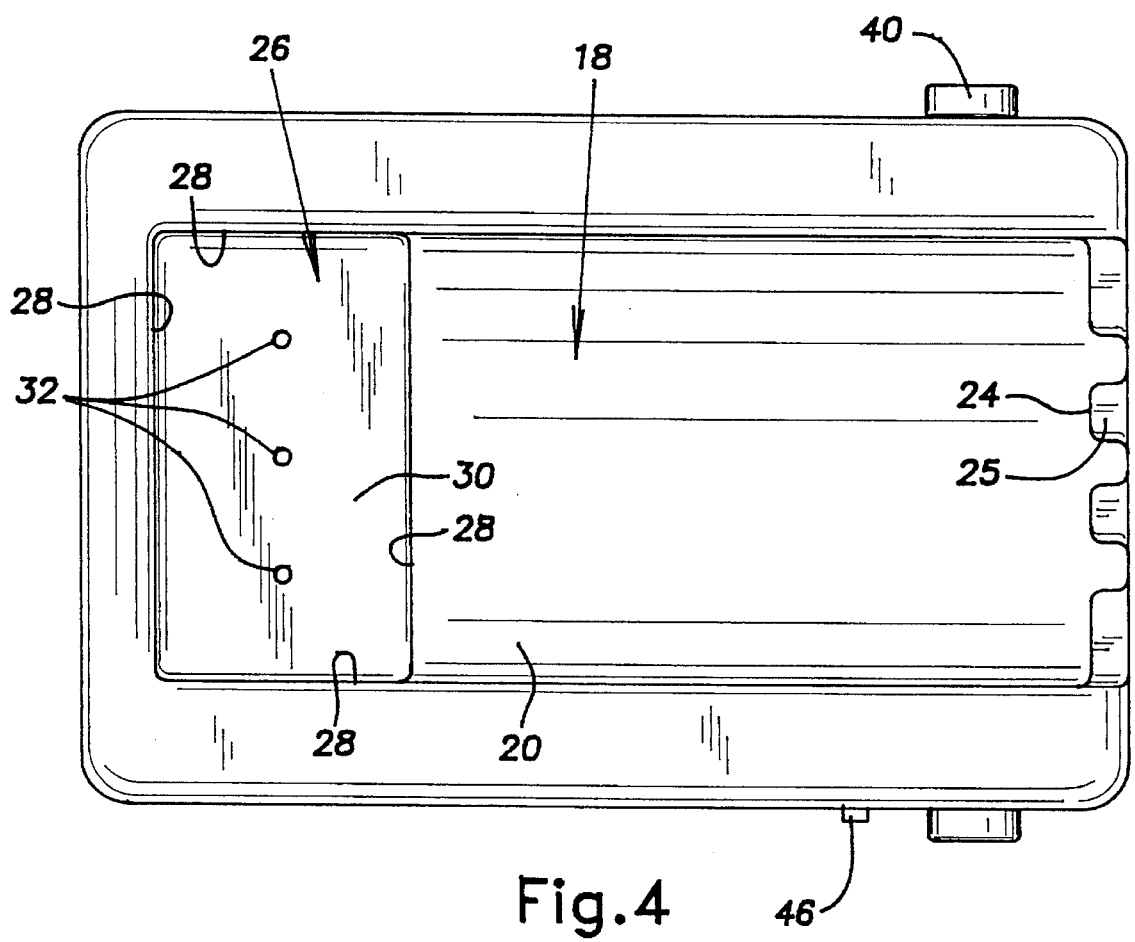
FIG. 4 shows a top view of the cart.

Referring to FIGS. 1 and 2, a drum cart has a body 10 formed of an inner wall 12 and an outer wall 14. The body is preferably made in a one piece construction of high density polyethylene or other suitable rigid, inert material.

The inner and outer walls 12 and 14 are spaced apart so as to form a containment space 16 therebetween, as shown in FIG. 2.

The inner wall 12 is inwardly curved to define a receptacle 18 or cradle. The receptacle 18 is defined by a partially cylindrical bottom support surface 20 for receiving and supporting a side of a cylindrical drum 22 and a rear support surface 24 at an end of the bottom support 20 for supporting an end of the drum 22. The drum 22 has an access opening 23 for filling and emptying the drum. The rear support 24 and/or the bottom support 20 may comprise a plurality of ribs having inclined edges 25, for example. The bottom support 20 has a length generally corresponding to the length of the drum 22.

At the end of the receptacle 18 opposite the rear support 24, a recess 26 is formed by the inner wall 12. The recess preferably has four side walls 28 and a bottom wall 30. A plurality of apertures 32 define passages from the recess 26 into the containment space 16. Preferably the combined area of the apertures 32 is greater than the area of the access opening 23 to prevent overflow from spilling out of the recess 26.

The outer wall 14 preferably has a curved surface 34 joining bottom and rear surfaces 36 and 38, as shown in FIG. 2. Either the bottom or rear surfaces 36 or 38 can rest on a floor or other surface to support the cart. The curved surface 34 facilitates tilting of cart between a horizontal position (shown) and a vertical position. The bottom support 20 is preferably angled slightly downwardly toward the recess 26 in the horizontal position, and channels 39 of the rear support 24 are preferably angled slightly toward the bottom support 20 in the vertical position to contain liquid in the receptacle 18 and direct the liquid toward the recess 26.

A pair of wheels 40 or rollers are mounted to the body 10 on an axle 42 near the curved surface 34. A drain hole 44 plugged by a removable drain plug 46 is located in the outer wall 14 at a convenient location for draining liquid from the containment space 16. A vent opening 48 (FIG. 2) is located in an upper portion of one of the walls 28 to permit air to escape from the containment space if contaminated fluid should flow therein.

In use, the drum 22 is placed in the cart 10 manually, with a crane, or by other means. During placement of the drum 22, the cart 10 may be in its horizontal position, shown in FIG. 1 or in its vertical position. When the cart is in its vertical position, the inclined edges 25 aid placement of the drum by providing a ramp on which the drum can be slid onto the cart. The drum is supported by the bottom support surface 20 and/or the rear support surface 24. While on the cart 10, the drum 22 can be filled or emptied. Preferably, the drum is opened or connections to the drum are made near the recess 26 so that spills or overflow are captured in the recess. Fluid in the recess flows through the apertures 32 and is contained within the containment space 16. The drum 22 and cart 10 are moved by tilting the cart so it rests on the wheels 40 and rolling the cart to a desired location. The containment space 16 is drained by removing the drain plug 46, tilting the cart, and allowing the fluid in the containment space to flow out into a suitable container. It should be appreciated that the volumetric containment capability of the containment space 16, i.e. at a containment level up to the vent opening 48, should exceed the volumetric capacity of the drum 22.

The present invention provides a lightweight and easily movable cart for holding and transporting a drum. The cart could be adapted to hold two or more drums or could be adapted to transport differently configured or sized containers. The cart should be configured to conform generally to the containers to be carried. Containment of spills and overflows is easily and safely accomplished to facilitate proper disposal thereof.

The present disclosure describes several embodiments of the invention, however, the invention is not limited to these embodiments. Other variations are contemplated to be within the spirit and scope of the invention and appended claims.

What is claimed:

1. A drum cart, comprising:

a body having an inner wall defining a receptacle comprising a drum support surface, a first portion of said drum support surface comprising a cylindrical surface for supporting a sidewall of a drum, a second portion of said drum support surface comprising a bottom support surface closing one end of said cylindrical surface, said inner wall being joined with and spaced from an outer wall to define a containment space therebetween, said inner wall further defining a recess at another end of said support surface for collecting any spillage or leakage from a drum;

a roller disposed on the body to permit movement of the cart; and an aperture in the recess defining a passage into the containment space for said leakage or spillage.

2. A drum cart according to claim 1, further comprising a drain hole through the outer wall and a drain plug removably received in the drain hole.

3. A drum cart according to claim 1, wherein said support surface conforms to the shape of an article to be supported.

4. A drum cart according to claim 1, wherein said second portion of said support surface defines an incline to facilitate loading of an article to be supported.

5. A drum cart according to claim 1, wherein the body is adapted to be tilted between a horizontal and a vertical position and any leakage of spillage in the containment space is contained therein.

6. A drum cart according to claim 1, wherein said recess opens generally upwardly when the body is in the horizontal position.

7. A drum cart comprising:

a body having an inner wall defining a receptacle comprising a drum support surface, a first portion of said drum support surface comprising a cylindrical surface for supporting a sidewall of a drum, a second portion of said drum support surface comprising a bottom support surface closing one end of said cylindrical surface, said inner wall being joined with and spaced from an outer wall to define a containment space therebetween, said inner wall further defining a recess at another end of said support surface for collecting any spillage or leakage from a drum;

a roller disposed on the body to permit movement of the cart;

a drum mounted on said cylindrical surface; and an aperture in the inner wall defining a passage into the containment space, said containment space having a volumetric capacity which is at least as great as a volumetric capacity of said drum.

8. A drum cart according to claim 7, wherein said drum has an access opening having an area which is smaller than an area defined by said aperture.

9. A drum cart according to claim 7, wherein a vent opening is provided in said inner wall.

10. A drum cart, comprising:

a body having an incurved inner wall defining a receptacle having a cylindrical bottom surface and a rear surface closing one end of said bottom surface and defining a drum support adapted to support a generally cylindrical drum, an outer wall spaced from the inner wall to define a containment space therebetween, and a recess formed in the inner wall and disposed adjacent another end of said bottom surface;

a roller disposed on the body to permit movement of the cart;

an aperture in the inner wall defining a passage into the containment space;

a drain hole through the outer wall; and a drain plug removably received in the drain hole.

11. A drum cart comprising:

an inner wall;

a first portion of said inner wall comprising a cylindrical support surface conforming to the cylindrical shape of a drum;

a second portion of said inner wall comprising a bottom support surface closing one end of said cylindrical surface;

an outer wall joined with the inner wall and spaced therefrom to define a containment space therebetween, said outer wall being adapted to rest on a floor surface;

a third portion of said inner wall comprising a recess at another end of the cylindrical support surface;

an aperture communicating between the recess and the containment space;

a roller disposed on the cart so as to support the outer wall above the floor surface at a certain angle of the cart for facilitating movement thereof;

a drain hole through the outer wall; and a removable drain plug in the drain hole.

* * * * *